United States Patent [19]

O'Neil

[11] Patent Number: 4,476,176

[45] Date of Patent: Oct. 9, 1984

[54] MULTI-COLORED PRINTING RIBBON INK BARRIER SYSTEM

[75] Inventor: Eugene J. O'Neil, Woodland Hills, Calif.

[73] Assignee: Dataproducts Corporation, Woodland Hills, Calif.

[21] Appl. No.: 473,026

[22] Filed: Mar. 7, 1983

[51] Int. Cl.[3] .......................... B32B 3/10; B32B 27/30; B32B 27/40

[52] U.S. Cl. .................................. 428/195; 400/240.2; 400/241.2; 428/423.1; 428/500; 428/914

[58] Field of Search ............ 428/195, 914, 411, 423.1, 428/500; 400/241.2, 240.2; 430/214

[56] References Cited

U.S. PATENT DOCUMENTS

| | | | |
|---|---|---|---|
| 2,759,586 | 8/1956 | Juengorkes | 400/241.2 |
| 3,906,123 | 9/1975 | Vincent et al. | 428/411 |

*Primary Examiner*—Thomas J. Herbert

*Attorney, Agent, or Firm*—Spensley, Horn, Jubas & Lubitz

[57] ABSTRACT

A multi-colored dye-based printing ribbon is disclosed which has a thermoplastic resinous barrier preventing the colored portions of the ribbon from interfusing.

4 Claims, 1 Drawing Figure

MULTI-COLORED PRINTING RIBBON INK BARRIER SYSTEM

BACKGROUND OF THE INVENTION

1. Field of the Invention

This invention relates to the manufacture of printing ribbons. More specifically, this invention relates to the manufacture of multi-colored printing ribbons used in wire matrix printers and having portions containing variously colored dye-based inks. The colored portions are separated by a barrier composition which prevents interfusion of the colors.

2. Prior Art

There are two major types of colored inks used in manufacturing colored printing ribbons. One type involves an ink composition containing small particles of insoluble organic or inorganic pigments as the coloring source disbursed in a non-drying oil. Although these pigment-based inks can be utilized to produce multi-colored printing ribbons, the use of pigment-based inks has several disadvantages associated with the pigments. For example, due to the multi-step process required to grind the pigments into the appropriate particle size, pigment-based inks are fairly expensive and difficult to manufacture. Further, the addition of the pigment particles to the vehicle results in a viscous paste-like ink. Thus, pigment-based colored printing ribbons do not readily recover or flow back into those areas of the ribbon previously printed upon. The dispersed pigment particles also cause the print wires in wire matrix printers to abrade and wear quickly. As a result, the printers are subject to increased maintainance.

The other type of colored ink used in manufacturing colored printing ribbons contains, rather than pigments, soluble dyes as the coloring source. Printing inks containing dyes as the coloring source are referred to herein as dye-based inks. These dye-based inks include, by way of example, dyes from the anthaquinone family with one such dye marketed under the trade name "Oil Soluble Blue II" and manufactured by BASF Wyandotte Corporation, and dyes from the nonionic azo family, with three such dyes marketed under the trade names "Sudan Red 7B", "Sudan Deep Black BB" and "Fluoral 5G" and also manufactured by BASF Wyandotte Corporation.

Dye-based inks have several advantages over pigment-based inks when used to produce colored printing ribbons. Such advantages include ready recovery due to their low viscosity and low abrasion and wear rates on the print wires in wire matrix printers due to the absence of particulate matter in the ink. However, the application of dye-based inks to the manufacture of multi-colored printing ribbons has been far from successful. Generally, dye-based inks cannot be used for multi-colored printing ribbons because the different colors on the ribbon quickly interfuse.

While the prior art does recognize the use of barriers in multi-colored printing ribbons, such barriers cause the ribbon to lose its flexibility. This is a significant disadvantage as the printing ribbons used in wire matrix printers flow through a torqued and rough flow path, at times, at very high speed.

One prior art reference, U.S. Pat. No. 2,759,586, does propose several different barriers for preventing interfusion of the colors on multi-colored printing ribbons having dye-based inks; however, those barriers have several disadvantages. For example, those barriers are prepared using solvents, thus necessitating a drying step in their manufacturing process. Several of those barriers specifically use toluene as the solvent; a solvent which cannot be used in many states of the United States as it is an air pollution hazard. Further, several of the barriers contain tricresyl phosphate and a glycerol ester of hydrogenated rosin; ingredients which cause the final product ribbon to be tacky. Tricresyl phosphate also would tend to dissolve some of the plastic components of wire matrix printers which contact the printing ribbon. Further still, the claimed barriers containing nitro cellulose and cellulose acetate have little, if any, adhesive properties and, as a result, those barriers cannot be sealed onto the ribbon's base material under flexing conditions.

Thus, there is a great need for flexible multi-colored printing ribbons which use dye-based inks, but where interfusion of the different colors is satisfactorily prevented. There is a further need for such a ribbon which retains the flexibility required in wire matrix printers.

Accordingly, the main object of the present invention is to provide a multi-colored printing ribbon in which the dye-based colors are satisfactorily prevented from interfusing without causing an adverse effect on the flexibility of the ribbon and which minimizes the abrasion and wear rate of the print wires in wire matrix printers.

The novel features which are believed to be characteristic of this invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as definition of the limits of the invention.

SUMMARY OF THE INVENTION

It has been found that printing ribbons containing two or more separated portions impregnated with dye-based ink compositions having different colors and being free from interfusion can be obtained by separating the differently colored portions of the ribbon with a thermoplastic resinous barrier. The barrier is selected from the group consisting of (a) a co-polymer of ethylene and vinyl acetate and (b) polyurethane polymers cross-linked with acrylic monomers. These barrier compositions satisfactorily prevent interfusion of the dye-based ink portions of a multi-colored printing ribbon. Further, these barrier compositions result in the manufacture of a multi-colored dye-based printing ribbon which is flexible and which minimizes the abrasion and wear rates of the print wires in wire matrix printers.

DETAILED DESCRIPTION OF THE INVENTION

Figure 1:
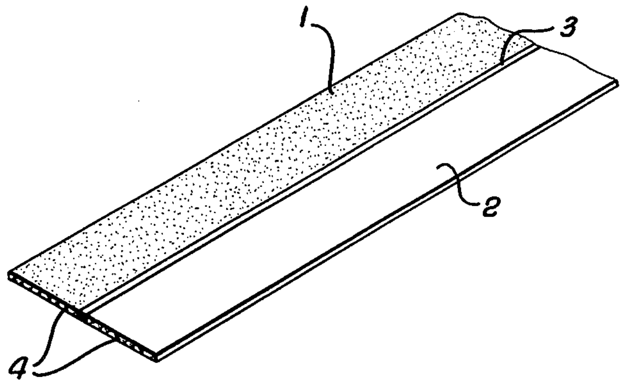
FIG. 1 is an isometric view of a printing ribbon of the present invention containing two differently colored portions separated by a barrier.

Referring to FIG. 1, colored portions 1 and 2 of the base ribbon material 4 are separated by barrier 3 extending, for example, along the longitudinal center line of the ribbon. The barrier consists of a composition as described more fully below.

The preferred barrier composition used in the present invention is a thermoplastic resin selected from the group consisting of (a) a hot melt composition consisting essentially of a co-polymer of ethylene and vinyl acetate, and (b) a fluid composition consisting essentially of polyurethane polymers and acrylic crosslinking monomers.

The acetate barrier has a softening range of from about 190° F. to about 205° F., preferably 199° F. The viscosity of the acetate barrier can range from about 3700 cps to about 23,500 cps at 350° F. Similar acetate barriers are commercially available under the trademark "Thermogrip 6330" sold by Bostik and, under the trademark "AMSCO-MELT 221" sold by Union 76 Chemicals Division.

The polyurethane barrier has a viscosity of approximately 400 cps at 24° C. and, prior to crosslinking,, is soluble in such organic solvents as acetone, toluene, and isopropyl alcohol. Upon exposure to actinic light, the monomer reacts with the polyurethane and forms a crosslinked matrix barrier. Similar polyurethanes are commercially available under the trademark "Hughson" sold by Lord Chemical Products.

In one embodiment of the present invention, the acetate barrier composition described above is used to separate the different dye-based colored portions of a printing ribbon. The acetate barrier composition is heated to well above its softening point, for example, 350° F., and applied to the base ribbon material by a roller system as a hot-melt. The method of hot-melt application and the roller system are well known in the art, and for that reason, will not be discussed at any great detail herein. When the acetate barrier composition contacts the base ribbon material, portion 3 expands slightly. Upon cooling, the barrier composition becomes essentially impregnated within the filaments of the base ribbon material; although, a slight raised surface effect may be present.

In another embodiment of the present invention, the polyurethane barrier composition described above is used to separate the different dye-based colored portions of a printing ribbon. The polyurethane barrier composition is applied to the base ribbon material using a pressurized hypodermic needle system. The composition is completely impregnated within the base ribbon materials filaments as a liquid injection and is subsequently cured and sealed onto the ribbon by subjecting the impregnated ribbon to ultraviolet light. Standard 200 Watt/linear inch medium pressure mercury vapor lamps are preferred ultraviolet light sources for curing in either air or an inert atmosphere. The method of injection by pressurized needles and the method of ultraviolet light curing is well known in the art, and for that reason, is not discussed at any great detail herein.

After the acetate or urethane-based barrier composition is applied to the ribbon and allowed to cool or cure, respectively, soluble dye-based inks are impregnated in the conventional manner within the desired ink bearing portions of the base ribbon material. As illustrated in FIG. 1, one colored dye-based ink is impregnated within the filaments of portion 1 and another differently colored dye-based ink is impregnated within the filaments of portion 2. The printing ribbons thus prepared have been found to be free from interfusion, flexible, and satisfactory in minimizing the abrasion and wear rates of the print wires in wire matrix printers.

It will be understood that the present invention can be applied not only to wire matrix printing machine ribbons, but also to ink transfer ribbons having a typing or similar mechanism, e.g., adding machines, printing machine and other business machine ribbons. The term "transfer" ribbon is used herein and in the appended claims to include all types of printing ribbons. The ink transfer ribbons are, according to the invention, comprised preferably of a woven base material, for example, nylon, or other fabric having an adequate ink supportive capacity, strength, flexibility, or another suitable tape or ribbon material. The width of the separating barrier strip 3 of the present invention may vary, but it has been found that a width in the range of 0.025" to 0.050" gives satisfactory results. The transfer ribbons according to the present invention may contain several colored portions, each separated by the barrier composition, with eight such portions longitudinally located on a single transfer ribbon having been found to operate successfully.

As will be apparent to those of skill in the art, the spirit of this invention is applicable to wide variations beyond those specifically set forth herein. This invention, therefore, is not to be limited beyond the spirit and scope set forth in the appended claims.

I claim:

1. A transfer ribbon having a plurality of elongated portions, each portion containing a dye-based ink, said portions defined at least in part by a thermoplastic resinous barrier which prevents the ink on said portions from interfusing, and wherein said barrier is formed by impregnating a portion of the ribbon with a composition consisting essentially of a heated, thermoplastic copolymer of ethylene and vinyl acetate and then cooling the impregnated thermoplastic copolymer thereby forming said barrier.

2. A transfer ribbon according to claim 1 wherein said thermoplastic copolymer has a softening range of from about 190° F. to about 205° F.

3. A transfer ribbon having a plurality of elongated portions, each portion containing a dye-based ink, said portions defined at least in part by a solid thermoplastic resinous barrier which prevents the ink on said portions from interfusing, wherein said barrier is formed by impregnating a portion of the ribbon with a composition consisting essentially of an actinic light crosslinkable liquid thermoplastic mixture of a polyurethane polymer and an acrylic monomer and then exposing the mixture to actinic light thereby causing said mixture to crosslink so as to form said solid barrier.

4. A transfer ribbon according to claim 3 wherein said liquid polyurethane polymer has a viscosity of about 400 cps at 24° C.

* * * * *